United States Patent
Cherukumudi et al.

(10) Patent No.: US 8,108,349 B1
(45) Date of Patent: Jan. 31, 2012

(54) DIRECTORY SERVICES INTEGRATION AND REPLICATION SYSTEM

(75) Inventors: Vijaykumar Cherukumudi, Overland Park, KS (US); David K. Fultz, Raymore, MO (US); Nadirshah N. Jivani, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 305 days.

(21) Appl. No.: 12/496,412

(22) Filed: Jul. 1, 2009

(51) Int. Cl.
*G06F 7/00* (2006.01)
(52) U.S. Cl. ........ 707/641; 707/713; 707/803; 707/809; 705/7.12; 709/203; 709/217
(58) Field of Classification Search ........... 707/999.102, 707/999.201, 999.204, 641, 713, 803, 809; 705/7.12; 709/203, 217
See application file for complete search history.

(56) References Cited

U.S. PATENT DOCUMENTS

| | | | |
|---|---|---|---|
| 7,020,662 B2 * | 3/2006 | Boreham et al. | 707/758 |
| 7,089,211 B1 * | 8/2006 | Trostle et al. | 705/51 |
| 7,107,297 B2 * | 9/2006 | Yellepeddy et al. | 707/999.204 |
| 7,162,499 B2 * | 1/2007 | Lees et al. | 707/638 |
| 7,571,180 B2 * | 8/2009 | Minyailov | 707/999.102 |
| 7,660,830 B2 * | 2/2010 | Ordille | 707/609 |
| 2008/0208958 A1 * | 8/2008 | Huff et al. | 709/203 |

* cited by examiner

*Primary Examiner* — Shew-Fen Lin
*Assistant Examiner* — Jieying Tang (57) ABSTRACT

A system for directory replication and integration is provided. The system comprises a computer system and an application, that when executed on the computer system, analyzes a first structure of a first directory services database and generates a plurality of configuration files based on the analysis of the first structure of the first directory services database. The system also creates a second structure using the configuration files and tests the second structure using load and performance profiles and adjusts the second structure based on the results of the tests. The system also replicates entries in first directory services database to a second directory services database according to the second structure.

12 Claims, 4 Drawing Sheets

DIRECTORY SERVICES INTEGRATION AND REPLICATION SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Directory services are information infrastructures for locating, administering, and organizing common data items such as users, groups, files, folders, computers, and printers on a computer network. Directory services map the names of resources and other objects to physical addresses on a network and may promote convenience in locating resources. Objects in a directory service may be organized in a hierarchical database structure. Users, groups, and resources are stored as objects and information about the objects is stored as attributes in schemas. Objects are described in classes with attributes providing specific information about objects such as name and primary characteristics. Object classes and their attributes have become standardized and widely accepted. Directory services have evolved to be readily accessible by various tools using computing protocols, the most common being the lightweight directory access protocol (LDAP), based on the transmission control protocol, internet protocol (TCP/IP) suite of networking protocols. Numerous vendors have developed proprietary directory services database implementations based on these protocols.

SUMMARY

In an embodiment, a system for directory replication and integration is provided. The system comprises a computer system and an application, that when executed on the computer system, analyzes a first structure of a first directory services database and generates a plurality of configuration files based on the analysis of the first structure of the first directory services database. The system also creates a second structure using the configuration files and tests the second structure using load and performance profiles and adjusts the second structure based on the results of the tests. The system also replicates entries in first directory services database to a second directory services database according to the second structure.

In another embodiment, a processor-implemented method for directory services integration and replication is provided. The method comprises an integration and replication server analyzing configuration information associated with the structures of a first directory services database, a second directory services database, and a third directory services database. The method also comprises the integration and replication server creating new configuration files describing a database structure combining structural elements based on the analysis of the configuration information. The method also comprises the integration and replication server consolidating a first schema used by the first directory services database with a second schema used by the second directory services database to create a fourth directory services database, the fourth directory services database structure in part created using the new configuration files. The method also comprises the integration and replication server adjusting system indexes associated with the first and second directory services databases to coexist in the fourth directory services database structure. The method also comprises the integration and replication server consolidating a third schema used by the third directory services database with a fourth schema created for the fourth directory services database to create a fifth directory services database, the fifth directory services database structure created in part using the new configuration files. The method also comprises the integration and replication server adjusting system indexes associated with the third and fourth directory services database to coexist in the fifth directory services database structure.

In another embodiment, a processor-implemented method for directory services integration and replication is provided. The method comprises executing test operations against a consolidated directory services database using load and performance profiles, the consolidated directory services database comprising a merger of a plurality of source directory services databases. The method also comprises generating results from the test operations, the results describing at least one of query errors, performance issues, structural gaps, and performance gaps in the consolidated directory services database. The method also comprises changing index structures and schema in the consolidated directory services database based on the results. The method also comprises using custom adapters to replicate entries made to the source directory services database to the consolidated directory services database.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a directory services integration and replication system permit the migration of a plurality of directory services databases to a single unified directory services database. The unified directory services database is accessible to applications previously using the legacy directory services databases. The unified directory services database is constructed by merging the legacy directory services databases in an iterative process that creates a merged database schema and structure accessible to applications using the legacy database structures. The iterative consolidation process produces one principal output per merger activity: a consolidated directory schema. The consolidated directory schema and structure are subjected to trial procedures using load and performance profiles. Test queries subject the proposed directory services database to stress testing scenarios. The testing and subsequent changes optimize and validate the structure before any data is moved from legacy directory services databases to the unified directory services database.

Analysis of test results may require changes in the schema design, changes in structure and placement of system indexes in the unified directory services database, and further validation before the unified directory services database is determined ready. In an embodiment, when the unified directory services database is determined ready and may begin receiving data, the source or legacy directory services databases may still receive entries and the source and unified directory services databases may replicate data entries between each other. In an embodiment, legacy directory services databases will eventually be decommissioned and removed from service once the unified directory services database has been performing at an acceptable level for a period of time.

Directory services database implementations may exhibit differences from one software vendor to the next and between different versions of a same directory services product sold by a single vendor. Incompatibilities between vendor implementations and versions may cause problems for organizations using many applications and having diffuse information technology operations. Software management tools that work with one directory services database implementation may not work properly or at all with a different implementation. A system administrator with expertise in one vendor's directory services products may be effective in using tools to draw information and manage those installed products but ineffective when working with another vendor's directory services products. The inability of software management tools to work with disparate directory services database implementations may cause productivity losses, create security and licensing risks, and raise management frustration.

The system analyzes the structures of the directory services databases that are under consideration for merger. The system uses helper class files to extract and analyze files that describe the schema, system index, and directory tree structures of the subject directory services databases. Syntactical and other processing rules are applied to convert the structural information to configuration files the system may use in merging the source directory services databases. The system may cycle through several iterations of source file analysis before its configuration files are constructed in a framework that can be used to create the proposed schema and directory tree structure for the unified directory services database. Some of the system index files used in source directory services databases may have to be moved or deleted in the unified directory services database to resolve conflicts and to optimize the structure in the unified directory services database. Testing is done to determine that the unified structure is sound and acceptably functional. If testing reveals structural or functional gaps in a proposed unified structure, it may be necessary to fully discard the proposed structure and return to the initial steps of analyzing the structure of the source directory services databases and creating a new proposed schema, directory tree, and index structure for the unified directory services database.

An organization that consolidates a plurality of directory services databases into a unified directory services database in the iterative process taught by the present disclosure may realize crossover benefits from combining the strengths and advantages of different source directory services databases into the unified directory services database. Insights may be gained about a portion of an organization's directory structure that were not previously apparent with a plurality of independent and separate directory services databases in operation. Economies of scale may be realized by applying tools previously useful in only limited areas of an organization's information technology environment in a unified directory services database structure. System administrators previously able to apply skills and tools useful only with the vendor implementations of their specialty may be able to extend their expertise across the organization. The ability to recognize and diagnose problems from a single vantage point may permit more rapid discovery and remedy of problems, realization of productivity improvements, and strategic insights across an organization.

Figure 1:
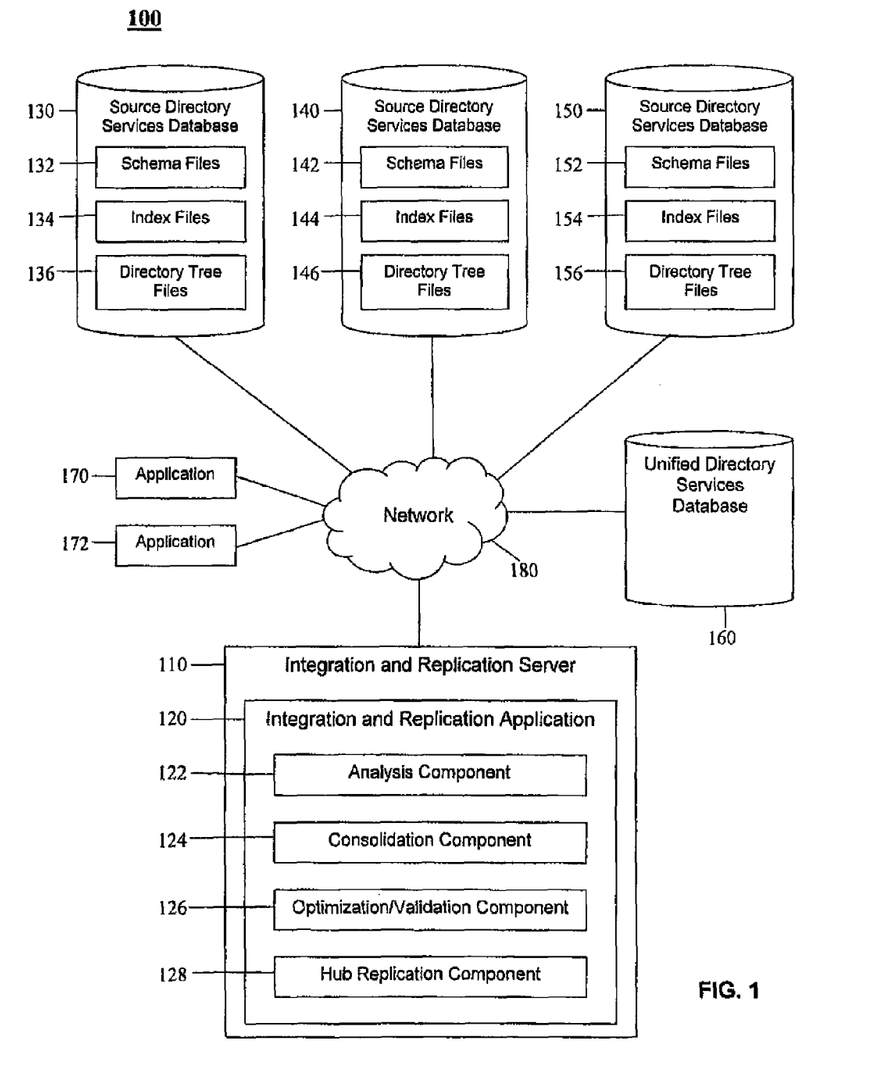
FIG. 1 is a block diagram of a system according to an embodiment of the disclosure.

Turning now to FIG. 1, a system 100 for directory services integration and replication is provided. The system 100 comprises an integration and replication server 110, an integration and replication application 120, a source directory services database 130, a unified directory services database 160, applications 170, 172, and a network 180. In some embodiments, additional source directory services databases 140, 150 will be present and active in the system 100. Attributes and functionality described with reference to the source directory services database 130 are representative in certain respects of the attributes and functionality of the additional source directory services database 140, 150, notwithstanding the source directory service databases 130, 140, 150 in some embodiments being products of different vendors or products of the same vendor but of different versions. In some contexts, the source directory services database 130 may be referred to as the first directory services database 130, the source directory services database 140 may be referred to as the second directory services database 140, and the source directory services database 150 may be referred to as the third directory services database 150.

When an organization is contemplating the merger of a plurality of source directory services databases 130, 140, an analysis component 122 of the integration and replication application 120 may examine schema files 132, 142, index files 134, 144, and directory tree files 136, 146 associated with the source directory services databases 130, 140. The analysis component 122 may extract information and apply syntactical rules and other procedures to the information drawn from the files. The analysis component 122 may convert the information into configuration files in structures and formats that may be read and processed during the merger of the source directory services databases 130, 140. A consolidation component 124 of the integration and replication application 120 processes the converted information and develops a preliminary schema, directory tree, and other specifications for a structure of the contemplated unified directory services database 160. An optimization/validation component 126 of the integration and replication application 120 then subjects the proposed structure to a series of tests involving load and performance profiles. If test results are not satisfactory, the consolidation component 124 may be reengaged to change the structure of the proposed unified directory services database 160 including deleting, moving, or otherwise altering system indexes. It may be necessary to further roll back the process to engage the analysis component 122 again to reanalyze and recreate the configuration files. When the steps of analysis, consolidation, and testing have been completed and the structure of the unified directory services database 160 is determined acceptable, the hub replication component 128 may replicate data entered into the source directory services databases 130, 140 into the unified directory services database 160 and the source directory services databases 130, 140 may eventually be removed from service.

The integration and replication server 110 may be a computer system. Computer systems are discussed in greater detail hereinafter. The integration and replication server 110 may comprise one computer or a plurality of computers, for example, a server farm wherein many server computers cooperate to share a processing load. The integration and replication server 110 may comprise a plurality of computers that are located at different places, for example, to provide geographical diversity and increased service reliability. The integration and replication server 110 executes one or more applications that provide services including hosting of the integration and replication application 120.

The integration and replication application 120 resides on the integration and replication server 110 and enables the consolidation and integration of structuring information from source directory services databases 130, 140, 150 into a unified directory services database 160 that serves a plurality of applications 170, 172. The integration and replication application 120 comprises the analysis component 122 that analyzes the files that describe the structure of source directory services databases 130, 140, 150. The analysis component 122 may comprise helper class files that analyze the schema files 132, 142, 152, index files 134, 144, 154, and directory tree files 136, 146, 156 that are the primary structural components of the source directory services databases 130, 140, 150, respectively. The analysis component 122 converts replicas or copies of the structure, syntactical naming and description information, and some contents of these files into formats that may be processed later by the consolidation component 124. The content of the schema files 132, 142, 152, index files 134, 144, 154, and directory tree files 136, 146, 156 is not itself altered by analysis component 122. Because the source directory services databases 130, 140, 150 remain actively in service, the analysis component 122 creates copies of those files. Analysis and conversion of file content is performed on the file copies in a work area segregated from the source directory services databases 130, 140, 150.

The analysis component 122, in converting schema, index, and directory tree information from source directory services databases 130, 140, 150 into a structure and format in configuration files that may be processed during consolidation, may use well known naming conventions for configuration files. In an embodiment, the analysis component 122 may create files containing schema information with the .ldif file extension. Index files may be created with the .txt file extension. Directory tree structure files may be created with a .dit file extension or the .ldif file extension. Other syntactical steps may be taken to associate the file names of configuration files with the vendor and version of the source directory services databases 130, 140, 150 from which the information in those configuration files originated.

The integration and replication application 120 also comprises the consolidation component 124 that receives configuration files created by the analysis component 122. The consolidation component 124 processes the configuration files to create a preliminary proposed structure for the unified directory services database 160. The proposed structure comprises a new schema that is a merger or consolidation of the one or more schemas provided by the source directory services databases 130, 140, 150. In creating the new schema, the consolidation component 124 combines the elements of the schemas from the source directory services databases 130, 140, 150 that best fit together in a merged schema to adequately serve the applications 170, 172 that use directory services. The consolidation component 124 follows a similar process with configuration files that describe system indexes and directory tree structures of source directory services databases 130, 140, 150. The consolidation component 124 attempts to create a proposed structure for the unified directory services database 160 that will accommodate the applications 170, 172 previously using the source directory services databases 130, 140, 150 while maintaining or even improving directory services performance as well as possibly adding new functionality. In an embodiment, not all of the applications 170, 172 previously served may be fully accommodated by the proposed structure and some functionality may be lost. In this case, maintenance may be performed on the subject application to restore or work around lost functionality.

The integration and replication application 120 also comprises the optimization/validation component 126 that subjects the proposed structure of the unified directory services database 160 to a plurality of stress test scenarios. The scenarios test the structure and durability of the proposed unified directory services database 160 to withstand a variety of query situations. The optimization/validation component 126 uses load and performance profiles to generate test loads on the proposed schema of the unified directory services database 160 to determine its ability to perform acceptably under various conditions. The load and performance profiles submit queries that request search, add, modify, and delete operations of the unified directory services database 160. The unified directory services database 160 at the time of schema structure testing may not have production data stored. Sample or dummy data may instead be loaded into the unified directory services database 160 and test queries may then be run in a controlled testing environment. The performance of the unified directory services database 160 in processing test queries is observed and measured. Based on the results of these queries, changes to the schema and directory tree structure of the unified directory services database 160 may be recommended.

In consolidating source directory services databases 130, 140, 150, it may also be necessary to alter, move, or delete system indexes. System indexes are database structures that support search and other operations in a directory services database. As source directory services databases 130, 140, 150 may originate from different vendors, the design philosophies underlying those database structures may be different. An effective consolidation of those structures may require changing of the some elements of those structures including the alteration or deletion of some system indexes originally placed by the vendors in their product code. The optimization/validation component 126 or the consolidation component 124 at an earlier stage may alter, move, or delete system indexes placed by the creators of source directory services databases 130, 140, 150. In an embodiment, pseudo-indexes, or indexes created by merging elements of several vendors' original system indexes, may be implemented. As system indexes may be columns placed in databases to facilitate the location of stored information, the implementation of pseudo-indexes may embody the combination or merger and/ or movement of system indexes within the proposed unified directory services database 160 to accommodate the needs of applications 170, 172. In an embodiment, a source directory services database 130 may also contain non-system indexes, indexes that are specific to applications. In an embodiment, non-system indexes are not changed because doing so may cause an associated application to fail or perform unacceptably.

Pseudo-system indexes may be created during the consolidation of two or more source directory services databases 130, 140, 150. Source directory services databases 130, 140, 150 may originate from different software vendors and may therefore be based on different development methodologies and be based on different structures. Conflicts may arise during consolidation that may be resolved by the creation of pseudo-system indexes that combine features of system indexes of contributing vendors. Creation of the pseudo-system indexes may permit the modification, movement, or elimination of some of the contributing vendors' proprietary system indexes that may be conflicting with each other and preventing effective consolidation. Pseudo-system indexes may replace or supplement contributing vendors' system indexes by preserving or enhancing needed functionality while disabling or eliminating the conflicting aspects of the contributing vendors' system indexes.

The optimization/validation component 126, as a result of its load and performance testing of the proposed unified directory services database 160, may recommend the changing or deletion of some system indexes and creation of pseudo-indexes. It may also identify more serious structural or functional gaps or deficiencies that may require a further rolling back of the process to reengage the analysis component 122 to analyze again the component schema files 132, index files 134, and directory tree files 136 that were converted to configuration files and made available to the consolidation component 124. As the component that may make a final determination about the structural and functional fitness of the unified directory services database 160, the optimization/validation component 126 may recommend that the proposed structure of the unified directory services database 160 is not acceptable and be fully dismantled with the process started over from the beginning. In an embodiment wherein a plurality of source directory services databases 130, 140, 150 are being merged in iterative progression into a unified directory services database 160, it may be necessary when serious deficiencies are discovered to completely roll back a source directory services database 130 out of the proposed unified directory services database 160 and begin again at the end of the immediately previous iteration.

The integration and replication application 120 also comprises the hub replication component 128 that facilitates the replication of directory services entries made to source directory services databases 130, 140, 150 to the unified directory services database 160. Source directory services databases 130, 140, 150 may remain functional and active even as the unified directory services database 160 is being established, tested, and brought online into production. Applications 170, 172 may continue to access the particular source directory services database 130, 140, 150 they have previously accessed but records of their access may be concurrently or subsequently replicated to the unified directory services database 160. The source directory services databases 130, 140, 150 may individually synchronize with the unified directory services database 160 by replicating entries made separately by each of the source directory services databases 130, 140, 150 to the unified directory services database 160. The hub replication component 128 uses custom adapters to extract entries made by applications 170, 172 to their source directory services database 130, 140, 150 and copy the entries to the unified directory services database 160. In an embodiment, once all of the source directory services databases 130, 140, 150 have been consolidated into the unified directory services database 160 and the unified directory services database 160 has been tested and determined to be functioning acceptably, the source directory services databases 130, 140, 150 may be retired and removed from service. In an embodiment, the unified directory services database 160 may subsequently be merged into the structure of a selected vendor and version of directory services database implementation that will be used going forward as the single directory services database in production for all applications 170, 172 in an organization's information technology environment.

While the discussion has been directed to consolidating a group of source directory services databases 130, 140, 150 into a unified directory services database 160 and then merging the unified directory services database 160 into the structure of a selected vendor and version of directory services database to be used going forward, in an embodiment, the structure of the selected vendor may be the target structure of the unified directory services database 160. The structure of the directory services database of the selected vendor targeted by the source directory services databases 130, 140, 150 may in effect be the framework for the unified directory services database 160.

The network 180 promotes communication between the components of the system 100. The network 180 may be any communication network including a public data network (PDN), a public switched telephone network (PSTN), a private network, and/or a combination thereof.

Figure 2:
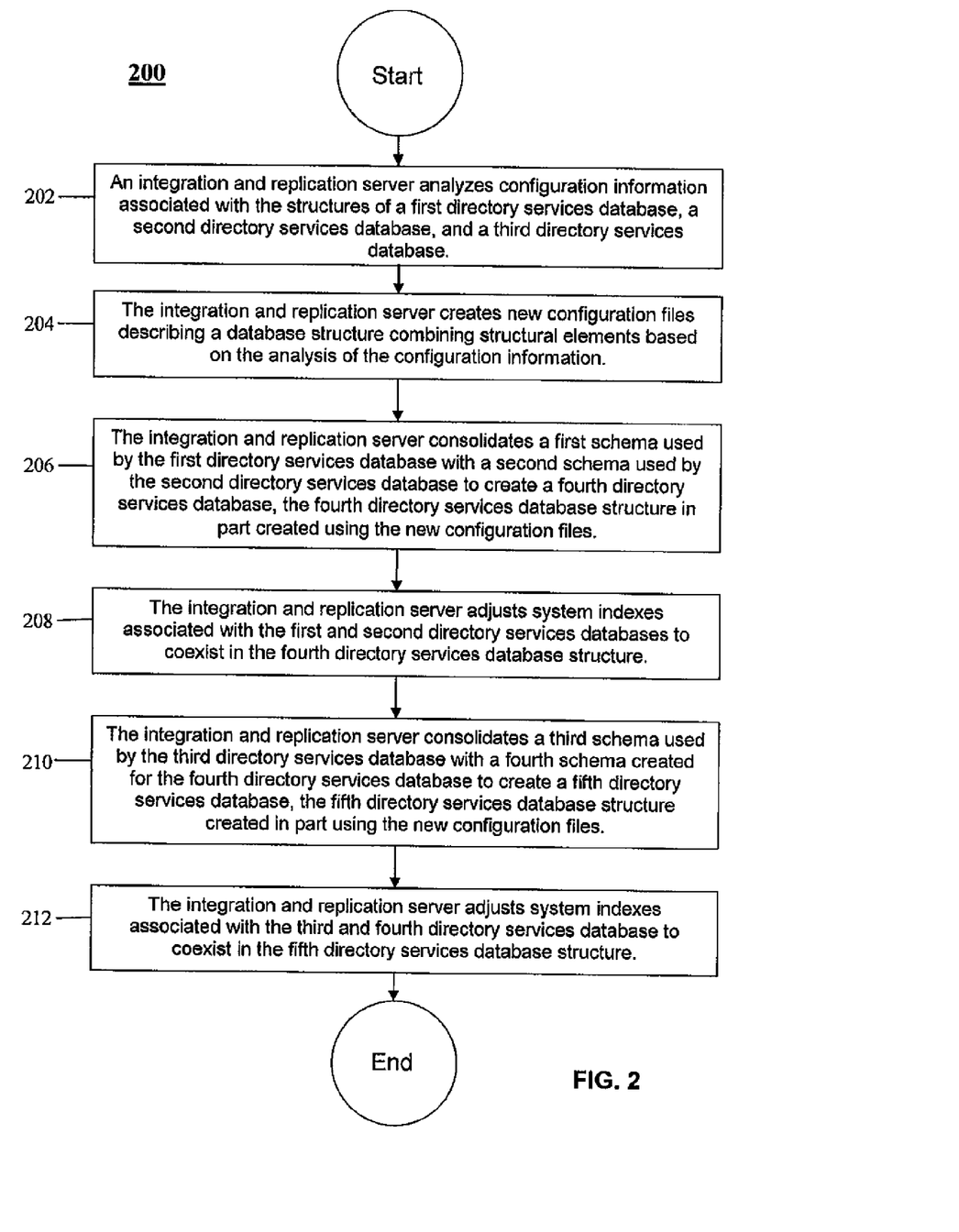
FIG. 2 is a flow chart illustrating a method according to an embodiment of the disclosure.

Turning now to FIG. 2, a method 200 for directory services integration and replication is provided. Beginning at block 202, the analysis component 122 on the integration and replication server 110 analyzes the structures of a first directory services database 130, a second directory services database 140, and a third directory services database 150. The analysis component 122 analyzes the schema files 132, 142, 152 to analyze the object classes and attributes of the objects used by each of their respective source directory services databases 130, 140, 150. The analysis component 122 may discover similarities and differences between the objects and their attributes across the source directory services databases 130, 140, 150 that may suggest how the source directory services databases 130, 140, 150 may be consolidated. The analysis component 122 also analyzes the index files 134, 144, 154 in a similar manner, to search for structural commonalities that may permit an effective consolidation of their hosting source directory services databases 130, 140, 150. The analysis component 122 finally analyzes the directory tree files 136, 146, 156 to examine methodically the similarities and differences between the structural organizations of the various objects contained by each of the hosting source directory services databases 130, 140, 150. The analysis component 122 may seek to suggest directory tree hierarchies or structures that permit the merger of the tree structures of each of the source directory services databases 130, 140, 150.

At block 204, the analysis component 122 on the integration and replication server 110 creates new configuration files that may describe a database structure that combines the structural elements of the first directory services database 130, the second directory services database 140, and the third directory services database 150. The database structure may be a preliminary framework that will permit the specific structural needs of the first directory services database 130, the second directory services database 140, and the third directory services database 150 to be served when they are merged, allowing applications 170, 172 to continue to be served. The new configuration files may draw essential structural elements from the schema files 132, 142, 152, the index files 134, 144, 154, and the directory tree files 136, 146, 156 to create the new configuration files and form the elements of a foundation or structural basis for all the source directory services databases 130, 140, 150 even though they may be merged together at a later time in separate, successive iterations. It may be necessary at the beginning of a series of iterative directory services database merger processes to develop an idea or framework for how the final, merged unified directory services database 160 will be structured at the end, when all of the source directory services databases 130, 140, 150 have been merged. While the final structure of the unified directory services database 160 cannot be predicted, projecting a common structural framework at the beginning may provide for the efficient merger of the constituent source directory services databases 130, 140, 150 along the steps of the method 200.

At block 206, the consolidation component 124 on the integration and replication server 110 performs a first iteration of combining the schema files 132, 142 of the first directory services database 130 and the second directory services database 140. This process creates a merged schema for a newly established unified directory services database 160 that for purposes of discussion in the method 200 is a fourth directory services database. During or after merging the schema files 132, 142 to create a merged schema, the consolidation component 124 also combines the merged schema with the new configuration files created at block 204 that will serve as a preliminary framework for the merger of the first directory services database 130 and the second directory services database 140 as well as the merger of the third directory services database 150 that is to take place in a subsequent iteration later in the method 200.

At block 208, the consolidation component 124 on the integration and replication server 110 may adjust the system indexes drawn from the index files 134, 144 to permit applications 170, 172 that previously used either the first directory services database 130 or the second directory services database 140 to also access the fourth directory services database. As the first directory services database 130 and the second directory services database 140 may have been created by different vendors, the correct placement of system indexes in the fourth directory services database may involve deleting some conflicting system indexes, moving other system indexes, and creating pseudo-system indexes by combining elements of vendor-created system indexes and adding supplemental software code to facilitate the combination. When the actions at block 208 have finished, the first iteration of merging the first directory services database 130 and the second directory services database 140 into a fourth or unified directory services database 160 is complete wherein a merged schema has been created and the system indexes have been situated in the merged structure.

At block 210, the consolidation component 124 on the integration and replication server 110 begins a second iteration of directory services database consolidation by merging the third directory services database 150 into the fourth or unified directory services database 160 that was created at blocks 206 and 208. The schema files 152 from the third directory services database 150 are merged by the consolidation component 124 with the schema files for the fourth or unified directory services database 160 created at block 206. Because early in the method 200 the new configuration files were created to serve as a preliminary framework for the first directory services database 130, the second directory services database 140, and the third directory services database 150, the merger of the schema files 152 with those of the fourth or unified directory services database 160 may be completed more smoothly than if the new configuration files had not been created by the analysis component 122 early in the method 200. The merger of the third directory services database 150 with the fourth or unified directory services database 160 creates a fifth directory services database that is effectively a revised or updated unified directory services database 160. The fifth directory services database comprises the merged schema files 132, 142, 152 of the three constituent source directory services databases 130, 140, 150 brought together in two separate iterations. Because of the actions taken early in the method 200 to create the new configuration files, the basic structure of the fifth directory services database also comprises a merged directory tree structure from the three constituent source directory services databases 130, 140, 150.

At block 212, the consolidation component 124 on the integration and replication server 110 takes steps similar to the actions at block 208 by examining the placement of system indexes resulting from the merger of the third directory services database 150 with the fourth directory services database to create the fifth or unified directory services database 160. As at block 208, system indexes may originate from different software vendors and may come in conflict when brought together in a merged directory services database. The consolidation component 124 assures correct positioning of system indexes in the fifth directory services database by possibly deleting some conflicting system indexes, moving other system indexes, and creating pseudo-system indexes by combining elements of vendor-created system indexes. Correct placement of system indexes allows applications 170, 172 that previously accessed at least one of the source directory services databases 130, 140, 150 to now access the fifth and unified directory services database 160.

Figure 3:
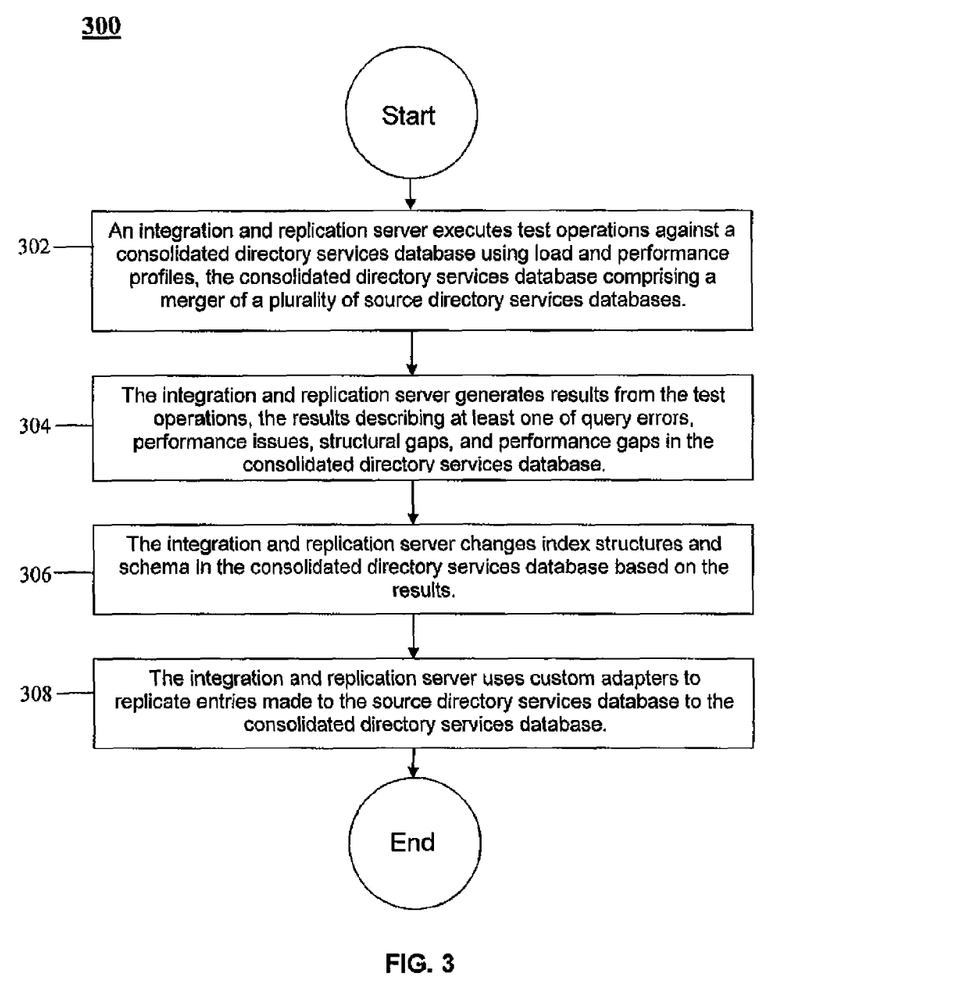
FIG. 3 is a flow chart illustrating another method according to an embodiment of the disclosure.

Turning now to FIG. 3, a processor-implemented method 300 for directory services integration and replication is provided. Beginning at block 302, the optimization/validation component 126 on the integration and replication server 110 executes test operations against a consolidated directory services database. In an embodiment, the consolidated directory services database may be the fifth directory services database or unified directory services database 160 described in the method 200 that consolidated three source directory services databases 130, 140, 150 in two separate iterations. The test operations executed by the optimization/validation component 126 comprise the use of load and performance profiles that submit a series of test queries to the unified directory services database 160. The test queries, which may comprise search, add, modify, and delete operations, generate a variety of load conditions on the unified directory services database 160. The testing creates a plurality of database stress scenarios that provide feedback on the structure and functionality of the unified directory services database 160.

At block 304, the integration and replication server 110 generates results and output from the test operations executed at block 302. The test results may comprise error message information generated by query processing, evidence of performance issues, and data that suggest structural or functional gaps in the current structure of the unified directory services database 160. The test results may be processed by analytical tools to promote further insight into the structure and stability of the unified directory services database 160. Performance issues may comprise overall slowness in processing queries, excessive processor or memory usage in handing queries, sluggish input and output operations, and other hardware and resource management problems. The application of analytical tools to the test results may provide insight into the overall fitness and suitability of the structure of the unified directory services database 160 for the intended business purposes and processing needs of the organization combining the source directory services databases 130, 140, 150. The test queries generated by the load and performance profiles may be designed with the organization's needs in mind and preferably approximate the types of queries and processing load to which the organization may subject the unified directory services database 160 when it is placed in production. The test queries and processing scenarios, in addition to testing the basic structure of the unified directory services database 160 may also test the stability of the unified directory services database 160 by submitting queries that subject it to unusual processing stresses, irregularities, and abnormalities that push the structure close to its operating limits.

At block 306, the schema and the system index structures in the unified directory services database 160 are adjusted in response to the results of the load and performance profile testing executed at block 302. In an embodiment, the merged schema in the unified directory services database 160 may contain conflicts that were not apparent to the consolidation component 124 during execution of the method 200. The results of the testing may reveal that further adjustments to the system indexes or creation of additional pseudo-indexes are required. After changes to the schema and/or system indexes are made to the unified directory services database 160, additional load and performance profile testing may be required with those results receiving analysis and subsequent action. In an embodiment, it may be determined that the unified directory services database 160 contains structural problems of a potentially destructive nature such as those that may result in a database crash, a loss of data, a corruption of data, and a vulnerability to viruses and other external threats. Such structural problems may suggest revisiting of the original component schema files 132, 142, 152, index files 134, 144, 154, and directory tree files 136, 146, 156 from the source directory services databases 130, 140, 150 by the analysis component 122. The unified directory services database 160 may not be determined ready to be brought into production until fundamental component issues are resolved and stability and performance are demonstrated to be acceptable under a plurality of stress scenarios.

At block 308, the hub replication component 128 on the integration and replication server 110 uses custom adapters to replicate entries made by applications 170, 172 to the source directory services databases 130, 140, 150 to the unified directory services database 160. The source directory services databases 130, 140, 150 and the unified directory services database 160 may coexist while the source directory services databases 130, 140, 150 are being analyzed and consolidated and may continue to coexist after the unified directory services database 160 has been determined fully acceptable and placed in production. In an embodiment, the source directory services databases 130, 140, 150 may be decommissioned and removed from service when the unified directory services database 160 has been operational for a period of time and is providing directory services to applications 170, 172 at an acceptable level of performance.

Figure 4:
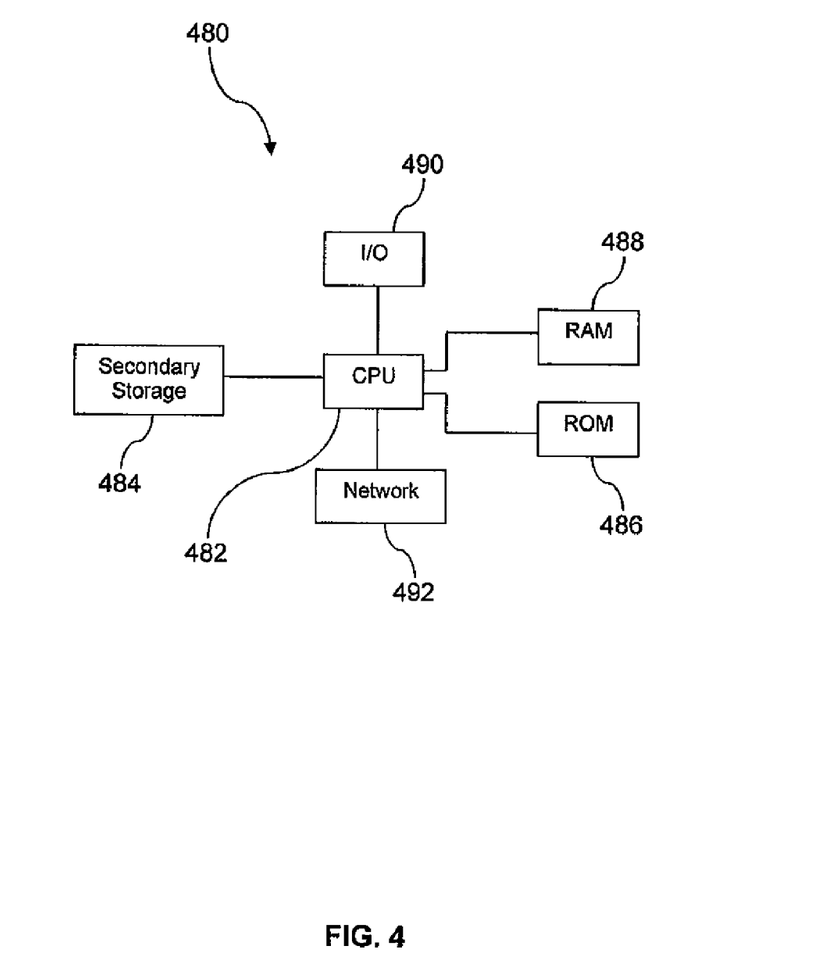
FIG. 4 illustrates an exemplary computer system suitable for implementing some aspects of several embodiments of the disclosure.

Some aspects of the system described above may be implemented on a computer with sufficient processing power, memory resources, and network throughput capability to handle the necessary workload placed upon it. FIG. 4 illustrates a typical computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method for directory replication and integration, comprising:
    an integration and replication server analyzing configuration information associated with the structures of a first directory services database, a second directory services database, and a third directory services database;
    the integration and replication server creating new configuration files describing a database structure combining structural elements based on the analysis of the configuration information;
    the integration and replication server consolidating a first schema used by the first directory services database with a second schema used by the second directory services database to create a fourth directory services database, the structure of the fourth directory services database in part created using the new configuration files;
    the integration and replication server adjusting system indexes associated with the first and second directory services databases to coexist in the structure of the fourth directory services database;
    the integration and replication server consolidating a third schema used by the third directory services database with a fourth schema created for the fourth directory services database to create a fifth directory services database, the structure of the fifth directory services database created in part using the new configuration files;
    the integration and replication server adjusting system indexes associated with the third and fourth directory services database to coexist in the structure of the fifth directory services database;
    executing test operations against the fifth directory services database using load and performance profiles;
    generating results from the test operations, the results describing at least one of query errors, performance issues, structural gaps, and performance gaps in the fifth directory services database;
    changing index structures and schema in the fifth directory services database based on the results; and
    using custom adapters to replicate entries made to one or more of the first directory services database, the second directory services database, and the third directory services database to the fifth directory services database.

2. The method of claim 1, wherein the fifth directory services database is accessible by applications previously using at least one of the first, second, and third directory services database.

3. The method of claim 1, wherein the first directory services database, the second directory services database, and the third directory services database function independently of each other and provide directory services to separate applications.

4. The method of claim 1, wherein analyzing configuration information is performed, at least in part, using helper class files that retrieve configuration files comprising at least directory data store files, index files, and directory entry files associated with the first directory services database, the second directory services database, and the third directory services database.

5. The method of claim 1, wherein new configuration files comprise schema files, index files, and directory tree files describing a database structure combining structural elements based on the analysis of the configuration information.

6. The method of claim 1, wherein an application that uses at least one of the first and second directory services databases continues making entries to the first and second directory services databases while the first and second directory services databases are being consolidated into the fourth directory services database.

7. The method of claim 1, wherein an application that uses at least one of the third and fourth directory services databases continues making entries to the third and fourth directory services databases while the third and fourth directory services databases are being consolidated into the fifth directory services database.

8. The method of claim 1, further comprising executing changes to configuration files associated with one or more of the first directory services database, the second directory services database, and the third directory services database based on results of the test operations.

9. The method of claim 1, wherein the custom adapters enable a directory entry intended for a specific vendor implementation of a directory services database to be entered into the fifth directory services database comprising a combination of directory services implementations provided by a plurality of vendors.

10. The method of claim 1, further comprising executing changes to system indexes provided by one or more of the first directory services database, the second directory services database, and the third directory services database based on results of the test operations.

11. The method of claim 1, wherein the test operations comprise at least search, add, modify, and delete operations that generate load stress on the fifth directory services database.

12. The method of claim 1, wherein the replicating is performed at least in part using a hub replication component that replicates entries made to the one or more of the first directory services database, the second directory services database, and the third directory services database to the fifth directory services database.

* * * * *